United States Patent
Scharf

(10) Patent No.: US 7,842,428 B2
(45) Date of Patent: Nov. 30, 2010

(54) CONSUMPTION-BASED FUEL CELL MONITORING AND CONTROL

(75) Inventor: Mesa Scharf, Bend, OR (US)

(73) Assignee: Idatech, LLC, Bend, OR (US)

( * ) Notice: Subject to any disclaimer, the term of this patent is extended or adjusted under 35 U.S.C. 154(b) by 1929 days.

(21) Appl. No.: 10/857,629

(22) Filed: May 28, 2004

(65) Prior Publication Data

US 2005/0266284 A1    Dec. 1, 2005

(51) Int. Cl.
  *H01M 8/04* (2006.01)
  *H01M 2/38* (2006.01)
  *H01M 2/40* (2006.01)
  *H01M 8/24* (2006.01)

(52) U.S. Cl. .................. 429/443; 429/428; 429/545

(58) Field of Classification Search .............. None
  See application file for complete search history.

(56) References Cited

U.S. PATENT DOCUMENTS

| | | | |
|---|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,765,946 A | 10/1973 | Werner et al. |
| 3,857,735 A | 12/1974 | Louis et al. |
| 3,877,989 A | 4/1975 | Waldman et al. |
| 3,920,416 A | 11/1975 | Houseman |
| 3,955,941 A | 5/1976 | Houseman et al. |
| 3,982,910 A | 9/1976 | Houseman et al. |
| 4,000,003 A | 12/1976 | Baker et al. |
| 4,003,343 A | 1/1977 | Lee |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,349,613 A | 9/1982 | Winsel |
| 4,351,405 A | 9/1982 | Fields et al. |
| 4,377,445 A | 3/1983 | Grimes |

(Continued)

FOREIGN PATENT DOCUMENTS

EP    1065741 A2    1/2001

(Continued)

OTHER PUBLICATIONS

English-language abstract of Japanese Patent No. 6176779, 1994.

(Continued)

*Primary Examiner*—Dah-Wei D Yuan
*Assistant Examiner*—Adam A Arciero
(74) *Attorney, Agent, or Firm*—Dascenzo Intellectual Property Law, P.C.

(57) ABSTRACT

Fuel cell systems and methods for controlling the operation of components of the fuel cell system, such as which may include a fuel source and a fuel cell stack. In some examples, a fuel source is adapted to provide supply fuel to a fuel cell stack at a supply pressure. In some systems, fuel not used by the fuel cell stack is discharged through at least one exit orifice at an exit pressure. In some examples, a control system is adapted to control operation of one or both of the fuel source and the fuel cell stack based on the flow of unused fuel. In some examples, a target pressure is determined based on the level of electrical current produced by a fuel cell stack, such that when fuel is supplied at the target pressure, the fuel cell stack consumes a given proportion of the supply fuel.

9 Claims, 3 Drawing Sheets

U.S. PATENT DOCUMENTS

| | | | |
|---|---|---|---|
| 4,387,434 A | 6/1983 | Moncrief, Jr. et al. | |
| 4,390,602 A | 6/1983 | Struthers | |
| 4,444,158 A | 4/1984 | Yoon | |
| 4,468,235 A | 8/1984 | Hill | |
| 4,472,176 A | 9/1984 | Rubin | |
| 4,473,622 A | 9/1984 | Chludzinski et al. | |
| 4,533,607 A | 8/1985 | Sederquist | |
| 4,553,981 A | 11/1985 | Fuderer | |
| 4,567,857 A | 2/1986 | Houseman et al. | |
| 4,642,273 A | 2/1987 | Sasaki | |
| 4,657,828 A | 4/1987 | Tajima | |
| 4,781,241 A | 11/1988 | Misage et al. | |
| 4,788,004 A | 11/1988 | Pinto et al. | |
| 4,820,594 A | 4/1989 | Sugita et al. | |
| 4,839,574 A | 6/1989 | Takabayashi | |
| 4,883,724 A | 11/1989 | Yamamoto | |
| 4,904,548 A | 2/1990 | Tajima | |
| 4,946,667 A | 8/1990 | Beshty | |
| 4,981,676 A | 1/1991 | Minet et al. | |
| 4,988,283 A | 1/1991 | Nagasawa et al. | |
| 5,006,846 A | 4/1991 | Granville et al. | |
| 5,030,661 A | 7/1991 | Lywood | |
| 5,139,894 A | 8/1992 | Mizuno et al. | |
| 5,154,986 A | 10/1992 | Takechi et al. | |
| 5,200,278 A | 4/1993 | Watkins et al. | |
| 5,229,222 A | 7/1993 | Tsutsumi et al. | |
| 5,334,463 A | 8/1994 | Tajima et al. | |
| 5,354,547 A | 10/1994 | Rao et al. | |
| 5,366,818 A | 11/1994 | Wilkinson et al. | |
| 5,366,821 A * | 11/1994 | Merritt et al. | 429/21 |
| 5,401,589 A | 3/1995 | Palmer et al. | |
| 5,417,051 A | 5/1995 | Ankersmit et al. | |
| RE35,002 E | 7/1995 | Matsubara et al. | |
| 5,432,710 A | 7/1995 | Ishimaru et al. | |
| 5,462,815 A | 10/1995 | Horiuchi | |
| 5,478,662 A | 12/1995 | Strasser | |
| 5,509,942 A | 4/1996 | Dodge | |
| 5,527,632 A | 6/1996 | Gardner | |
| 5,624,768 A | 4/1997 | Tanokura | |
| 5,631,532 A | 5/1997 | Azuma et al. | |
| 5,631,820 A | 5/1997 | Donnelly et al. | |
| 5,637,414 A | 6/1997 | Inoue et al. | |
| 5,658,681 A | 8/1997 | Sato et al. | |
| 5,677,073 A | 10/1997 | Kawatsu | |
| 5,705,916 A | 1/1998 | Rudbeck et al. | |
| 5,712,052 A | 1/1998 | Kawatsu | |
| 5,714,276 A | 2/1998 | Okamoto | |
| 5,763,113 A | 6/1998 | Meltser et al. | |
| 5,771,476 A | 6/1998 | Mufford et al. | |
| 5,780,179 A | 7/1998 | Okamoto | |
| 5,795,666 A | 8/1998 | Johnssen | |
| 5,798,186 A | 8/1998 | Fletcher et al. | |
| 5,821,185 A | 10/1998 | White et al. | |
| 5,846,669 A | 12/1998 | Smotkin et al. | |
| 5,861,137 A | 1/1999 | Edlund | |
| RE36,148 E | 3/1999 | Strasser | |
| 5,897,766 A | 4/1999 | Kawatsu | |
| 5,897,970 A | 4/1999 | Isomura et al. | |
| 5,927,416 A | 7/1999 | del Re et al. | |
| 5,929,538 A | 7/1999 | O'Sullivan et al. | |
| 5,932,181 A | 8/1999 | Kim et al. | |
| 5,964,309 A | 10/1999 | Kimura et al. | |
| 5,985,474 A | 11/1999 | Chen et al. | |
| 5,989,739 A | 11/1999 | Zur Megede et al. | |
| 5,991,670 A | 11/1999 | Mufford et al. | |
| 5,997,594 A | 12/1999 | Edlund et al. | |
| 5,998,053 A | 12/1999 | Diethelm | |
| 6,001,499 A | 12/1999 | Grot et al. | |
| 6,007,931 A | 12/1999 | Fuller et al. | |
| 6,013,385 A | 1/2000 | DuBose | |
| 6,022,634 A | 2/2000 | Ramunni et al. | |
| 6,042,956 A | 3/2000 | Lenel | |
| 6,045,772 A | 4/2000 | Szydlowski et al. | |
| 6,045,933 A | 4/2000 | Okamoto | |
| 6,051,192 A | 4/2000 | Maston et al. | |
| 6,054,229 A | 4/2000 | Hsu et al. | |
| 6,083,637 A | 7/2000 | Walz et al. | |
| 6,096,449 A | 8/2000 | Fuglevand et al. | |
| 6,103,409 A * | 8/2000 | DiPierno Bosco et al. | 429/13 |
| 6,103,410 A | 8/2000 | Fuller et al. | |
| 6,120,923 A | 9/2000 | Van Dine et al. | |
| 6,165,633 A | 12/2000 | Negishi | |
| 6,171,574 B1 | 1/2001 | Juda et al. | |
| 6,214,484 B1 | 4/2001 | Hauer | |
| 6,221,117 B1 | 4/2001 | Edlund et al. | |
| 6,242,120 B1 | 6/2001 | Herron | |
| 6,245,214 B1 | 6/2001 | Rehg et al. | |
| 6,342,316 B1 | 1/2002 | Okamoto | |
| 6,348,278 B1 | 2/2002 | LaPierre et al. | |
| 6,383,670 B1 | 5/2002 | Edlund et al. | |
| 6,421,593 B1 | 7/2002 | Kempen et al. | |
| 6,451,464 B1 | 9/2002 | Edlund et al. | |
| 6,458,477 B1 | 10/2002 | Hsu | |
| 6,495,277 B1 | 12/2002 | Edlund et al. | |
| 6,522,955 B1 | 2/2003 | Colborn | |
| 6,537,690 B1 | 3/2003 | Karrupaiah et al. | |
| 6,864,003 B2 | 3/2005 | Ueda et al. | |
| 6,893,755 B2 * | 5/2005 | Leboe | 429/17 |
| 2001/0049038 A1 | 12/2001 | Dickman et al. | |
| 2002/0020623 A1 | 2/2002 | Speranza et al. | |
| 2002/0127447 A1 | 9/2002 | Edlund et al. | |
| 2003/0049505 A1* | 3/2003 | Kameya et al. | 429/25 |
| 2003/0113601 A1 | 6/2003 | Edlund et al. | |
| 2003/0118882 A1* | 6/2003 | Voss | 429/25 |
| 2004/0080297 A1 | 4/2004 | Leboe | |
| 2004/0106026 A1* | 6/2004 | Fujita et al. | 429/24 |
| 2005/0119842 A1 | 6/2005 | Clingerman et al. | |

FOREIGN PATENT DOCUMENTS

| | | |
|---|---|---|
| JP | 02086069 | 3/1990 |
| JP | 4-163860 | 6/1992 |
| JP | 2000067894 | 3/2000 |
| JP | 2002246051 | 8/2002 |
| WO | WO 99/65097 | 12/1999 |
| WO | WO 00/02282 | 1/2000 |
| WO | WO 00/04600 | 1/2000 |

OTHER PUBLICATIONS

English-language abstract of Japanese Patent No. 7057758, 1995.
English-language abstract of German language PCT Patent Publication No. WO 97/43796, 1997.
English-language abstract of Japanese Patent No. 11116202, 1999.
English-language abstract of Japanese Patent No. 2-168803, 1999.
English-language abstract of Japanese Patent No. 63-236269, 1999.
English-language abstract of German language PCT Patent Application Serial No. WO 00/04600, 2000.
Edlund, David J. and William A. Pledger, "The Practical Use of Metal-Membrane Reactors for Industrial Applications," The 1995 Membrane Technology Reviews, pp. 89-97 (Nov. 1994).
Nadal, M. et al., "Development of a Hybrid Fuel Cell/Battery Powered Electric Vehicle," International Journal of Hydrogen Energy, vol. 21, No. 6, pp. 497-505, Jun. 1, 1996.
Oertel, Michael, et al., "Steam Reforming of Natural Gas with Integrated Hydrogen Separation for Hydrogen Production," Chemical Engineering Techology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Privette et al., "Status of SOFCo SOFC Technology Development," presented at the 1996 Fuel Cell Seminar held Nov. 17-20, 1996 in Orlando, Florida, pp. 206-209.

* cited by examiner

US 7,842,428 B2

CONSUMPTION-BASED FUEL CELL MONITORING AND CONTROL

TECHNICAL FIELD

The present disclosure relates generally to fuel cell systems, and more particularly to systems and methods for determining and controlling fuel usage in a fuel cell system.

BACKGROUND OF THE DISCLOSURE

An electrochemical fuel cell is a device that converts fuel and an oxidant to electricity, a reaction product, and heat. For example, fuel cells may be adapted to convert hydrogen and oxygen into water and electricity. In such fuel cells, the hydrogen is the fuel, the oxygen is the oxidant, and the water is the reaction product.

A fuel cell stack is one or more fuel cells, including groups of fuel cells, coupled together as a unit. A fuel cell stack may be incorporated into a fuel cell system. A fuel cell system also typically includes a fuel source, such as a supply of fuel and/or a fuel processor. An example of a fuel processor is a steam reformer. The system may also include a battery bank, which stores produced electrical power, and an air source, which delivers oxygen to the fuel cell. There is a need to control fuel cell stacks and other fuel cell system components to regulate the operation of the system, such as to prevent damage to the system and/or to operate the system efficiently in response to applied loads.

SUMMARY OF THE DISCLOSURE

The present disclosure relates to fuel cell systems and methods for monitoring fuel use and/or controlling the operation of at least one of a fuel source and a fuel cell stack based on fuel use. In some examples, a fuel cell system includes a fuel source. In some examples, the fuel source is adapted to provide supply fuel to a fuel cell stack at a supply pressure. In some systems, fuel not used by the fuel cell stack is discharged through at least one exit orifice at an exit pressure. In some examples, a control system is adapted to detect the exit pressure and to determine the flow of unused fuel based on the exit pressure, and to control operation of at least one of the fuel source and the fuel cell stack based on the determined flow of unused fuel.

In some examples, a target pressure is determined based on the level of electrical current produced by a fuel cell stack, such that when fuel is supplied at the target pressure, the fuel cell stack consumes a given proportion of the supply fuel. Typically, a fuel cell stack is operated in a range of voltage and current such that the output electrical power is directly proportional to the output current (i.e., increasing current yields increasing power).

Also, in some examples, a fuel source is adapted to produce the supply fuel from one or more feedstocks. The use of the feedstocks by the fuel source is controlled based on one or more of the target pressure and the flow of fuel.

DETAILED DESCRIPTION AND BEST MODE OF THE DISCLOSURE

As has been mentioned, methods and systems are disclosed for controlling the operation of at least one of a fuel source and a fuel cell stack. As used herein, a fuel cell stack includes one or more fuel cells, whether individually or in groups of fuel cells, and an energy producing and consuming assembly includes one or more fuel cell stacks, at least one fuel source for the fuel cell stack(s), and at least one energy consuming device adapted to exert an applied load on the fuel cell stack.

Figure 1:
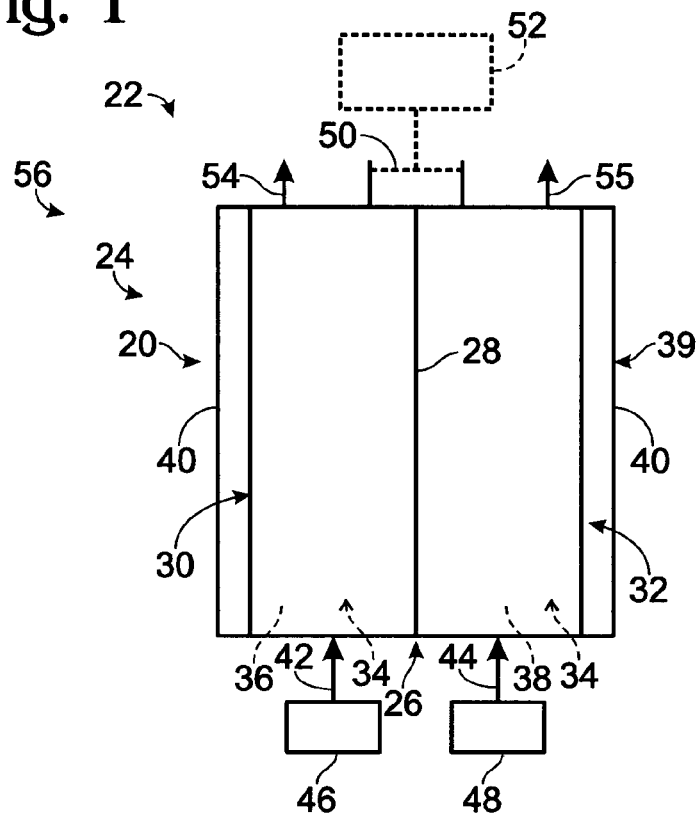
FIG. 1 is a schematic view of a fuel cell.

The subsequently discussed fuel cell stacks and systems are compatible with a variety of different types of fuel cells, such as proton exchange membrane (PEM) fuel cells, alkaline fuel cells, solid oxide fuel cells, molten carbonate fuel cells, phosphoric acid fuel cells, and the like. For the purpose of illustration, an exemplary fuel cell 20 in the form of a PEM fuel cell is schematically illustrated in FIG. 1. The fuel cell may be described as forming a portion of a fuel cell system, such as generally indicated at 22, and/or a portion of a fuel cell stack, such as generally indicated at 24. Proton exchange membrane fuel cells typically utilize a membrane-electrode assembly 26 consisting of an ion exchange, or electrolytic, membrane 28 located between an anode region 30 and a cathode region 32. Each region 30 and 32 includes an electrode 34, namely an anode 36 and a cathode 38, respectively. Each region 30 and 32 also includes a support 39, such as a supporting plate, 40. Support 39 may form a portion of the bipolar plate assemblies that are discussed in more detail herein. The supporting plates 40 of fuel cell 20 carry the relative voltage potential produced by the fuel cell.

In operation, fuel 42 is fed to the anode region, while oxidant 44 is fed to the cathode region. Fuel 42 may also be referred to as supply fuel 42. A typical, but not exclusive, fuel for cell 20 is hydrogen, and a typical, but not exclusive, oxidant is oxygen. As used herein, hydrogen refers to hydrogen gas and oxygen refers to oxygen gas. The following discussion will refer to fuel 42 as hydrogen 42 and oxidant 44 as oxygen 44, although it is within the scope of the present disclosure that other fuels and/or oxidants may be used. Hydrogen 42 and oxygen 44 may be delivered to the respective regions of the fuel cell via any suitable mechanism from respective sources 46 and 48. Examples of suitable fuel sources 46 for hydrogen 42 include at least one pressurized tank, hydride bed or other suitable hydrogen storage device, and/or a fuel processor that produces a stream containing hydrogen gas. Examples of suitable sources 48 of oxygen 44 include a pressurized tank of oxygen or air, or a fan, compressor, blower or other device for directing air to the cathode region. Hydrogen and oxygen typically combine with one another via an oxidation-reduction reaction. Although membrane 28 restricts the passage of a hydrogen molecule, it will permit a hydrogen ion (proton) to pass therethrough, largely due to the ionic conductivity of the membrane. The free energy of the oxidation-reduction reaction drives the proton from the hydrogen gas through the ion exchange membrane.

As membrane 28 also tends not to be electrically conductive, an external circuit 50 is the lowest energy path for the remaining electron, and is schematically illustrated in FIG. 1.

In practice, a fuel cell stack contains a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load, such as from at least one of an energy-consuming device, the fuel cell system itself, etc.

At least one energy-consuming device 52 may be electrically coupled to the fuel cell, or more typically, the fuel cell stack. Device 52 applies a load to the cell/stack/system and draws an electric current therefrom to satisfy the load. This load may be referred to as an applied load, and may include thermal and/or electrical load(s). Illustrative examples of devices 52 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, batteries and even the balance-of-plant electrical requirements for the fuel cell system of which stack 24 forms a part. An energy producing and consuming assembly, which is illustrated generally in FIG. 1 at 56, includes at least one fuel cell system 22 and at least one energy-consuming device 52 adapted to exert an applied load to, or upon, the fuel cell system.

In cathode region 32, electrons from the external circuit and protons from the membrane combine with oxygen to produce water and heat. Also shown in FIG. 1 are an anode purge or discharge stream 54, which may contain hydrogen gas, and a cathode air exhaust stream 55, which is typically at least partially, if not substantially, depleted of oxygen. It should be understood that fuel cell stack 24 will typically have common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

Figure 2:
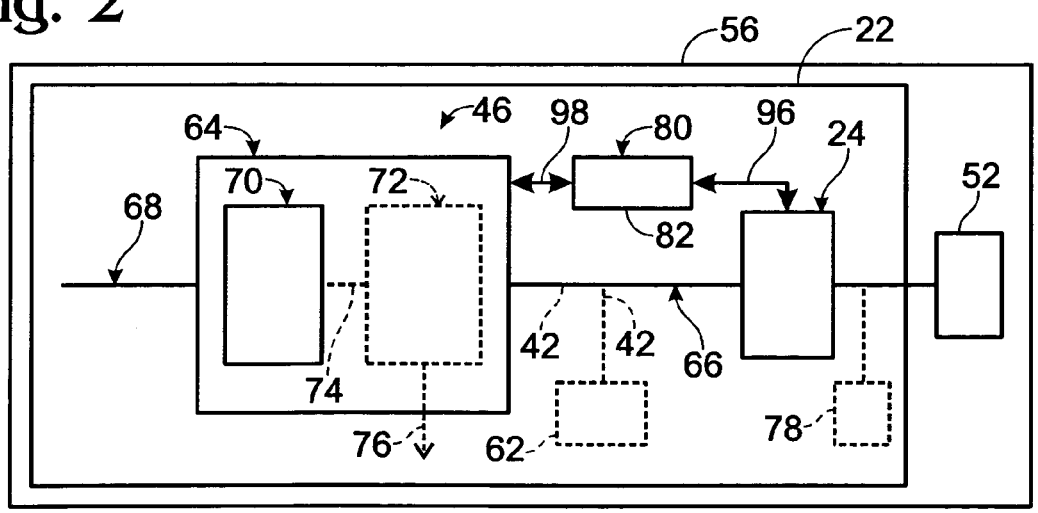
FIG. 2 is a schematic view of a fuel cell system including a fuel cell stack, a fuel source, and a control system.

As discussed above, many fuel cell stacks utilize hydrogen gas as a reactant, or fuel. Therefore, a fuel cell stack 24 may be coupled with a source 46 of hydrogen gas 42 (and related delivery systems and balance-of-plant components) to form a fuel cell system 22. An illustrative example of a fuel cell system is schematically illustrated in FIG. 2. As discussed previously with respect to FIG. 1, examples of sources 46 of hydrogen gas 42 include a storage device 62 that contains a stored supply of hydrogen gas, as indicated in dashed lines in FIG. 2. Examples of suitable storage devices 62 include pressurized tanks and hydride beds. An additional or alternative source 46 of hydrogen gas 42 is the product stream from a fuel processor, which produces hydrogen by reacting a feed stream to produce the stream containing hydrogen gas 42 or to produce reaction products from which the stream containing hydrogen gas 42 is formed, such as after one or more purification steps. As shown in solid lines in FIG. 2, system 22 includes at least one fuel processor 64 and at least one fuel cell stack 24. Fuel processor 64 is adapted to produce a product hydrogen stream 66 containing hydrogen gas 42 from a feed stream 68 containing one or more feedstocks. The fuel cell stack is adapted to produce an electric current from the portion of product hydrogen stream 66 delivered thereto. In the illustrated example, a single fuel processor 64 and a single fuel cell stack 24 are shown; however, more than one of either or both of these components may be used. These components have been schematically illustrated and the fuel cell system may include additional components that are not specifically illustrated in the Figures, such as air delivery systems, heat exchangers, sensors, flow-regulating devices, heating assemblies and the like. As also shown, hydrogen gas may be delivered to stack 24 from one or more of fuel processor 64 and storage device 62, and hydrogen from the fuel processor may be delivered to one or more of the storage device and stack 24. Some or all of stream 66 may additionally, or alternatively, be delivered, via a suitable conduit, for use in another hydrogen-consuming process, burned for fuel or heat, or stored for later use.

Fuel processor 64 includes any suitable device that produces hydrogen gas from the feed stream. Accordingly, fuel processor 64 may be described as including a hydrogen-producing region 70 in which a stream that is at least substantially comprised of hydrogen gas is produced from a feed stream. Examples of suitable mechanisms for producing hydrogen gas from feed stream 68 include steam reforming and autothermal reforming, in which reforming catalysts are used to produce hydrogen gas from a feed stream containing water and at least one carbon-containing feedstock. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Feed stream 68 may be delivered to fuel processor 64 via any suitable mechanism and/or via any suitable feedstock delivery system. Although only a single feed stream 68 is shown in FIG. 2, more than one stream 68 may be used and these streams may contain the same or different feedstocks. As used herein, the term "fuel processing assembly" may be used to refer to the fuel processor and associated components of the fuel cell system, such as feedstock delivery systems, heating assemblies, separation regions or devices, air delivery systems, fuel delivery systems, fluid conduits, heat exchangers, fuel processor controllers, etc. All of these illustrative components are not required to be included in any fuel processing assembly or used with any fuel processor according to the present disclosure. Similarly, other components may be included or used.

In many applications, it is desirable for the fuel processor to produce at least substantially pure hydrogen gas. Accordingly, the fuel processor may utilize a process that inherently produces sufficiently pure hydrogen gas. Alternatively, the fuel processing assembly and/or the fuel processor may include one or more suitable purification and/or separation devices that remove impurities from the hydrogen gas produced in the fuel processor. When region 70 does not produce pure hydrogen gas, stream 66 may include one or more of such illustrative impurities as carbon monoxide, carbon dioxide, water, methane, and unreacted feedstock. As another example, the fuel processing system or fuel cell system may include one or more purification and/or separation devices downstream from the fuel processor. This is schematically illustrated in FIG. 2, in which a separation region 72 is shown in dashed lines. When fuel processor 64 includes a separation region 72, the hydrogen-producing region may be described as producing a mixed gas stream that includes hydrogen gas and other gases. Similarly, many suitable separation regions will produce from this mixed gas stream at least one product stream, such as stream 66, that contains at least substantially pure hydrogen gas and at least one byproduct stream that contains at least a substantial portion of the other gases. A mixed gas stream and a byproduct stream are schematically illustrated in FIG. 2 at 74 and 76, respectively. The separation region, or regions, may be housed with the hydrogen-producing region within a common shell, attached to the fuel processor, or separately positioned from the fuel processor (but still in fluid communication therewith).

Separation region 72 may utilize any process or mechanism for increasing the purity of the hydrogen gas and/or decreasing the concentration of one or more other gases (such as carbon monoxide and/or carbon dioxide) that may be mixed in with hydrogen gas. Illustrative examples of suitable processes include one or more of chemical separation processes, in which one or more of the other gases are selectively adsorbed or reacted and thereby separated from the hydrogen gas, and physical separation processes, in which a physical barrier is used to selectively divide the mixed gas stream into the at least one product and byproduct streams. Examples of suitable physical separation processes include pressure-driven separation processes, in which the mixed gas stream is delivered into contact with suitable separation structure under pressure, with the pressure differential between the mixed gas region and at least one permeate or product region of the separation structure driving the separation process.

An illustrative chemical separation process is the use of a methanation catalyst to selectively reduce the concentration of carbon monoxide present in stream 74. Other illustrative chemical separation processes include partial oxidation of carbon monoxide to form carbon dioxide and water-gas shift reactions (to produce hydrogen gas carbon dioxide from water and carbon dioxide).

Non-exclusive examples of suitable pressure-driven separation processes include the use of one or more hydrogen-selective membranes and the use of a pressure swing adsorption system. Illustrative examples of suitable hydrogen-selective membranes include membranes formed from palladium or palladium alloys, such as alloys of palladium and copper or silver. The thin, planar, hydrogen-permeable membranes are preferably composed of palladium alloys, most especially palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membranes may be made thinner, with commensurate increase in hydrogen flux. The hydrogen-permeable membranes may be arranged in any suitable configuration, such as arranged in pairs around a common permeate channel as is disclosed in the incorporated patent applications. The hydrogen permeable membrane or membranes may take other configurations as well, such as tubular configurations, which are disclosed in the incorporated patents. An example of a suitable structure for use in separation region 72 is a membrane module, which contains one or more hydrogen permeable membranes. Examples of suitable hydrogen-selective membranes, methods for forming and utilizing the membranes, and separation devices that include one or more hydrogen-selective membranes are disclosed in U.S. Pat. Nos. 6,319,306, 6,537,352 and 6,562,111, the complete disclosures of which are hereby incorporated by reference for all purposes.

Another example of a suitable pressure-separation process for use in separation region 72 is pressure swing adsorption (PSA). In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from the mixed gas stream.

In the context of a fuel cell system, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Illustrative, nonexclusive examples of suitable fuel processors are disclosed in U.S. Pat. Nos. 6,221,117, 5,997,594, 5,861,137, and pending U.S. patent application Publication No. 2001/0045061. The complete disclosures of the above-identified patents and patent application are hereby incorporated by reference for all purposes.

FIG. 2 also schematically depicts that fuel cell systems 22 may (but are not required to) include at least one energy-storage device 78. Device 78 is adapted to store at least a portion of the current produced by fuel cell stack 24. More particularly, the current may establish a potential that can be later used to satisfy an applied load, such as from energy-consuming device 52 and/or fuel cell system 22. Energy-consuming device 52 may be adapted to apply its load to one or more of stack 24 and energy-storage device 78. An illustrative example of a suitable energy-storage device 78 is a battery, but others may be used. Device 78 may additionally or alternatively be used to power the fuel cell system during startup of the system.

Also shown in FIG. 2 is a control system 80 with a controller 82 that is adapted to control one or both of the fuel cell stack 24 and the fuel source 46. The performance of system 22 is regulated and automatically adjusted responsive to operating parameters and changes in the operating parameters detected by control system 80.

Controller 82 is illustrated as being implemented as a unit. It may also be implemented as separate controllers, such as a controller for the fuel cell stack and a controller for the fuel source. Such separate controllers, then, can communicate with each other via appropriate communication linkages. Control system 80 may include one or more analog or digital circuits, logic units or processors for operating programs stored as software in memory, and, as has been mentioned, may include one or more discrete units in communication with each other.

In the example shown in FIG. 2, controller 82 communicates with fuel cell stack 24 and fuel source 46 via appropriate communication linkages 96 and 98, respectively. Other linkages not shown also may be used. For example, there may be linkages to oxygen source 48. Linkages 96 and 98 enable at least one-way communication with the controller. Preferably, the linkages enable two-way communication with the controller, thereby enabling the controller to measure or monitor selected values, or selected variables, of stack 24 and source 46, while also controlling the operation of these units, typically responsive to the measured values. The linkages may include any suitable interface, actuator and/or sensor for effecting the desired monitoring and control. Control system 80 may also include or communicate with sensors, switches, feedback mechanisms, other electrical and/or mechanical circuits, and the like. Values of fuel cell stack 24 that may be detected include stack current, stack voltage, applied load, stack temperature, water conductivity, and air flow.

Other examples of values that may be monitored for a fuel source 46 in the form of a fuel processor 64 include the mode of operation of the fuel processor, the supply of feedstock, the rate at which hydrogen gas is being produced, the operating temperature, and the stoichiometry of the chemical process for producing fuel. An example of a monitored value for the air source is the rate at which air is being supplied to the fuel processing assembly and the fuel cell stack. When oxygen source 48 is incorporated into either or both of the fuel source and/or fuel cell stack, its operation and measurement will typically be incorporated into the corresponding linkage for the unit into which it is incorporated. Not all of these values are necessarily essential, and other values may be measured as well, depending on the particular requirements and configuration of the fuel cell system, the complexity of the system, the desired level of control, and particular user preferences.

Typical modes of operation for a fuel processor include start-up, shutdown, idle, running (active, hydrogen-producing), and off. In the off operating state, the fuel processor is not producing hydrogen gas and is not being maintained at suitable operating conditions to produce hydrogen gas. For example, the fuel processor may not be receiving any feed streams, may not be heated, etc. In the start-up operating state, the fuel processor is transitioning from the off state to its running operating state, in which the fuel processor is at its desired operating parameters for producing hydrogen gas, is receiving feedstock(s) and producing more than a nominal flow of hydrogen gas therefrom for delivery to the fuel cell stack and/or hydrogen-storage device. Accordingly, in the start-up state, the fuel processor is being brought to the desired operating conditions, such as temperature and pressure, for producing hydrogen gas. For example, fuel processors in the form of steam reformers typically operate at temperatures in the range of 200° C. and 800° C., and at pressures in the range of 50 psi and 1000 psi (gauge), although temperatures and pressures outside of these ranges are within the scope of the disclosure, such as depending upon the particular type and configuration of fuel processor being used. In the standby, or idle, operating state, the fuel processor is not producing any hydrogen gas, or only a nominal flow of hydrogen gas, with this flow typically not being delivered to the fuel cell stack or hydrogen-storage device. Instead, any produced hydrogen gas (or other output stream) is typically vented or utilized as a combustible fuel in a burner or other heating assembly. However, in the idle operating state, the fuel processor is typically maintained at the desired operating parameters for producing hydrogen gas, such as upon delivery of the appropriate feed stream(s), whereupon the fuel processor may be returned to its running operating state. It is within the scope of the present disclosure that, in the idle operating state, the above-discussed nominal flow of hydrogen, when present, is sufficient to produce enough electric current to power the fuel cell system and/or recharge the system's energy-storage device. In the shutdown operating state, the fuel processor is transitioning to its off operating state, such as from its running or idle operating states.

Figure 3:
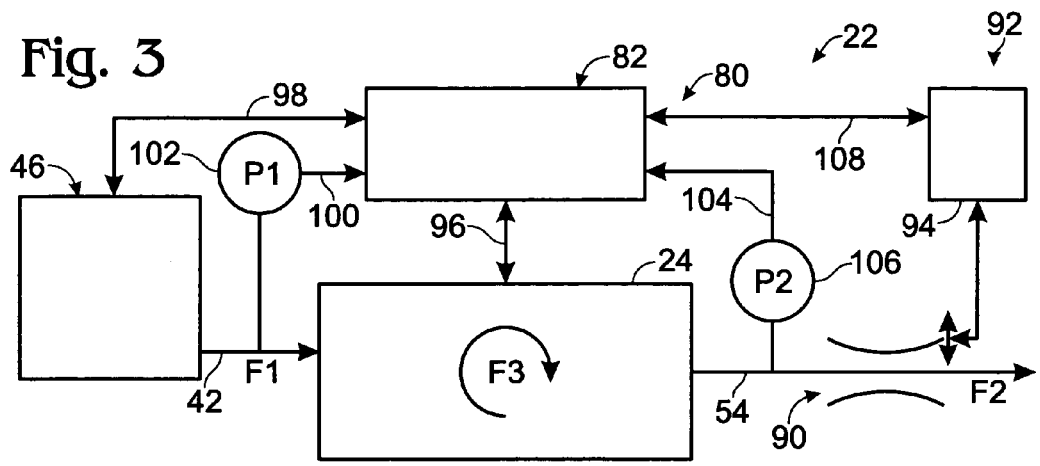
FIG. 3 is a schematic view of another example of a fuel cell system including a fuel cell stack, a fuel source, and a control system.

FIG. 3 is a schematic of fuel cell system 22 adapted to include fuel cell stack 24, fuel source 46, and control system 80. Supply fuel 42 flows, with a pressure $P_1$ and as flow $F_1$, from fuel source 46 to the anode region(s) of fuel cell stack 24. Stack 24 processes a portion $F_3$ of flow $F_1$ to produce electrical power. The remaining unused fuel, referred to as flow $F_2$, is discharged from the stack as discharge stream 54, through at least one exit orifice 90. Accordingly, the fuel flow in fuel cell stack 24 can be represented by the equation $F_1 = F_2 + F_3$.

In some examples, control system 80 is adapted to control the size of at least one of the one or more exit orifices. In such an example, exit orifice 90 may be part of a valve 92 having an orifice adjusting mechanism 94. By controlling the size of the exit orifice, the rate of flow $F_2$ is controlled, and the exit pressure $P_2$ is controlled. In some fuel cell systems 22, a change in the exit pressure produces a corresponding change in the supply pressure $P_1$. In this way, the supply pressure may be controlled by controlling the discharge pressure. Although referred to herein simply as an exit orifice, it is within the scope of the present disclosure that more than one orifice may be used, and/or that two or more outlets or other apertures may collectively be referred to as the exit orifice.

As illustrated, controller 82 is adapted to communicate over a linkage 100 with a pressure gauge 102 adapted to detect pressure $P_1$ of the supply fuel supplied to fuel cell stack 24 by fuel source 46. Similarly, a linkage 104 provides communication with a pressure gauge 106 adapted to detect pressure $P_2$ of the unused fuel prior to discharge from fuel cell stack 24. Further, a linkage 108 provides communication between the controller and valve 92, and can provide for communication of control signals transmitted from the controller and receipt of values related to the size of exit orifice 90. All of these illustrative communication linkages and interrelationship are not required. For example, the pressure of the supply fuel may not be measured and/or control may not be based at least partially thereupon in all embodiments. As a illustrative, non-exclusive variation, the system may include a pressure relief valve or other pressure controller that is adapted to detect whether a maximum, or upper, pressure threshold is reached or exceeded, with the system thereby not actively measuring the particular pressure of the supply fuel. Instead, the measurement, or operating parameter, is simply whether the pressure has reached or exceeded a particular threshold pressure.

Fuel cell system 22 may be adapted to discharge unused fuel from fuel cell stack 24 in different modes. These modes include at least a continuous bleed mode and a purge-based or dead-end mode. In a continuous bleed mode, unused fuel is discharged continuously and concurrently from the fuel cell stack 24, during production of electricity by the fuel cell stack. In some fuel cell systems 22 operated in a continuous bleed mode, such as in the context of the illustrative fuel cell system and parameters discussed subsequently, exit orifice 90 may have a fixed size and/or flow characteristics (including a combination of orifices having a combined size and flow characteristic) appropriate for a particular application, and the exit pressure and flow depend on the supply pressure and flow consumed by the fuel cell. As an example, an exit orifice size of less than 0.1 inch in diameter, such as 0.033 inches in diameter, or another selected size in the range of 0.02-0.07 inches in diameter may be used. Although circular orifices having particular diameters are mentioned, the exit orifice, as a single orifice or combination of orifices, may have any appropriate individual and/or collective cross-sectional size, shape and/or flow characteristics suitable for use in a particular system and/or application.

In other examples of fuel cell systems 22 operated in a continuous bleed mode, the size of the exit orifice 90 is varied to change the rate of flow F2, the exit pressure P2, the supply pressure P1, or a combination of these. In such systems, the orifice size may be variable over a small range of values, or it may be variable over a wide range of values, depending on the valves used, the operating characteristics of the fuel cell stack, and the controller.

In fuel cell systems 22 operating in a purge-based or dead-end mode, unused fuel is discharged from the fuel cell stack 24 intermittently for limited periods of time. In some examples of systems 22, orifice 90 is kept substantially closed between discharges of unused fuel. The fuel cell stack then is operated so that fuel is supplied at a rate that matches or nearly matches consumption.

During purging or discharging of the fuel cell, valve 92 is opened wide so that fuel can flow rapidly through exit orifice 90. Although not required, the period between purges can be much longer than the duration of discharge. As an example, a purge of one second may take place every thirty seconds of operation of the fuel cell stack. If one liter of fuel is discharged during each purge, and 49 liters of fuel are consumed in the production of electricity between purges, the fuel cell stack is utilizing 98 percent of the fuel. As such, the fuel cell stack may be described as having 98% utilization of the fuel.

The duration of each purge, the frequency of the purges, or both, are varied in some fuel cell systems. The varying of the frequency and/or duration of purges provides for control of the utilization of the fuel. An increase in either the duration or frequency of the purges produces a corresponding decrease in the utilization of fuel, for given operating conditions of the fuel cell system. In other examples, changing the frequency and/or duration of purges may be made to maintain a selected utilization level. For example, at reduced levels of consumption of fuel by the fuel cell stack, or at reduced supply fuel pressures P1, purges may be of shorter duration and/or decreased frequency. Conversely, at higher levels of consumption and/or higher supply fuel pressures, purges may be of longer duration and/or increased frequency.

In some examples, control system 80 may be adapted to control fuel source 46 and/or fuel cell stack 24, based at least in part on the flow of supply fuel to the fuel cell stack. For example, the production of supply fuel may be controlled by controlling the stoichiometry of the associated chemical process and/or the production efficiency of a fuel processing assembly, and/or by controlling the release of supply fuel from a storage device, and/or by adjusting the operating state, rate of production, etc. of fuel source 46 as required to meet electrical load requirement 52 or 78. In some examples of fuel cell systems, the flow F1 of fuel is not readily measured directly. In such examples, then, flow F1 may be determined indirectly by determining the fuel consumed by the stack, represented by flow F3, and the flow P2 of unused fuel discharged from orifice 90.

Figure 4:
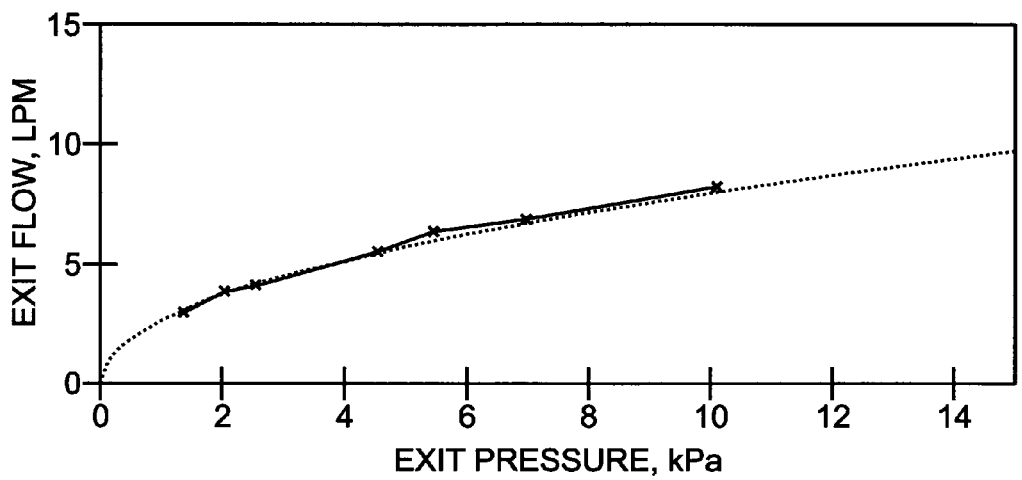
FIG. 4 is a graph of an example of unused fuel flow through a fuel cell exit orifice as a function of the exit pressure.

FIG. 4 is a graph of the flow, in liters per minute (L/min), of the unused fuel discharged through exit orifice 90 as a function of the exit pressure, P2, in kPa, where k is the numerical prefix kilo, and Pa is the unit for pressure, Pascals. The points on the graph indicated by an "x" and connected by solid line segments, represent empirical values. The dotted line represents the equation $F2=K\sqrt{P2}$, where K=2.53 (L/min)/(sqrt (kPa)) in this example. It is seen that the approximate formula works well to determine flow based on the exit pressure, P2. Accordingly, by use of this formula, as an example, control system 80 may be adapted to detect the exit pressure P2, and to determine the flow F2 of unused fuel based on the detected exit pressure. As used herein, "based on" is meant to neither exclude nor require additional factors. Accordingly, "based on" should be construed to include "based at least in part on" one or more indicated factors, but not to require additional factors. For example, a control system that utilizes the above formula to determine flow based on the exit pressure may, but is not required to, also utilize other factors in this determination. The same applies to the other "based on" relationships described and/or claimed herein.

In at least some fuel cell stacks, the flow F3 of fuel consumed by the fuel cell stack has been determined to be directly proportional to the electrical current output of the fuel cell stack, here represented as Ifc. Generally, fuel cell stacks are operated such that the output electrical power increases with the output electrical current. In this case, then, the flow is determined by the equation $F3=b \cdot Ifc$. Although the value of "b" depends on the operating characteristics of the individual fuel cell stack, in some fuel cell stacks, the value of b may be less than 1, and in particular, a value of 0.589 has been determined to be reasonably accurate for some fuel cell stacks.

In some examples of fuel cell stacks 24, ranges of operating parameters may be established. The following operating parameters apply to some exemplary fuel cell stacks constructed and operated according to the present disclosure. It is within the scope of the disclosure that other operating parameters are utilized or otherwise apply. As illustrative examples, the maximum and minimum current ranges for a particular stack may be greater or less than the illustrative values presented below.

| Parameter | Maximum | Minimum |
|---|---|---|
| Fuel Inlet Pressure Range (gauge): | 12 kPa | 0.8 kPa |
| Air Inlet Pressure Range (gauge): | 6.21 kPa | 0.3 kPa |
| Fuel/Air Delta Range (differential): | 11.7 kPa | 0.5 kPa |
| Fuel Utilization: | 83% | 70% |
| Stack Current Range: | 60 A | 20 A |

As indicated above, the flow F1 of fuel into the fuel cell stack may be determined by summing the flow F2 out of the exit orifice and the flow F3 consumed by the fuel cell stack. Using the above equations, the exit flow F2 may be determined from the exit pressure P2, and the consumption flow F3 may be determined from the fuel cell current Ifc. In equation form, $F1=b \cdot Ifc+K\sqrt{P2}$. This function defines a surface of points in a space having as axes, supply fuel flow, fuel cell current, and exit pressure.

Utilization, U, of the fuel by the fuel cell stack may be defined as the proportion of the supply fuel flow F1 that is used for production of power, or $$U = \frac{F3}{F1} = \frac{F3}{F2+F3} = \frac{b \cdot Ifc}{b \cdot Ifc + K\sqrt{P2}}.$$

Solving for P2, the equation becomes $$P2 = b^2 Ifc \frac{(1-U)^2}{K^2 U^2}.$$

Figure 5:
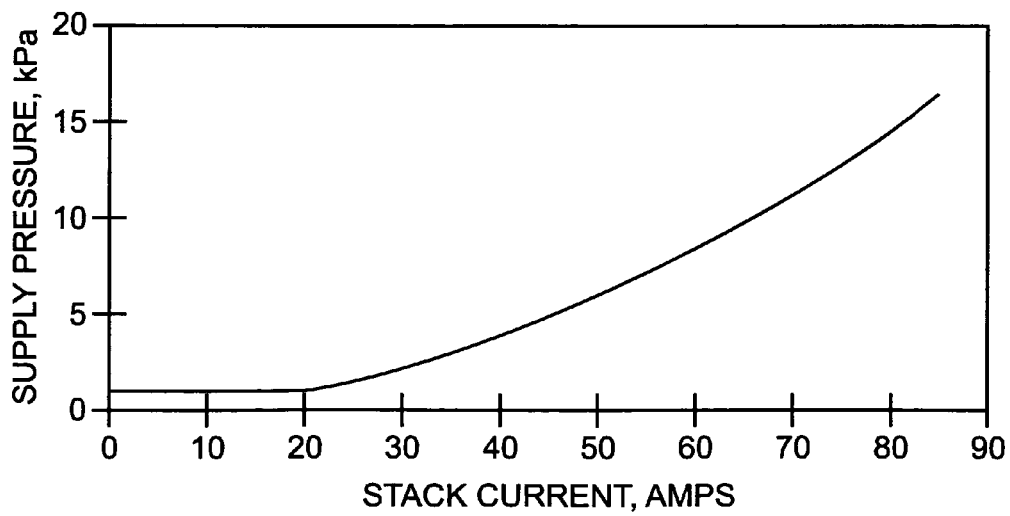
FIG. 5 is a graph of an example of a target fuel supply pressure as a function of a fuel cell stack current.

In order to achieve a selected utilization level for a given fuel cell current, a specific exit pressure is required. The supply pressure, then, is equal to the exit pressure plus a pressure drop in the fuel cell. In this example, this pressure drop is negligible. FIG. 5 is a graph of exit pressure as a function of stack current for an illustrative utilization level of 83% for a fuel cell stack constrained by the ranges of operating parameters listed above. Other utilization levels would produce different curves, and other fuel cell stacks would have different operating characteristics. It is within the scope of the present disclosure that other utilization levels may be used, such as levels in the range of 83-100%, in the range of 70-83%, in the range of 50-70%, less than 70%, less than 50%, greater than 70%, greater than 80%, greater than 90%, etc.

Figure 6:
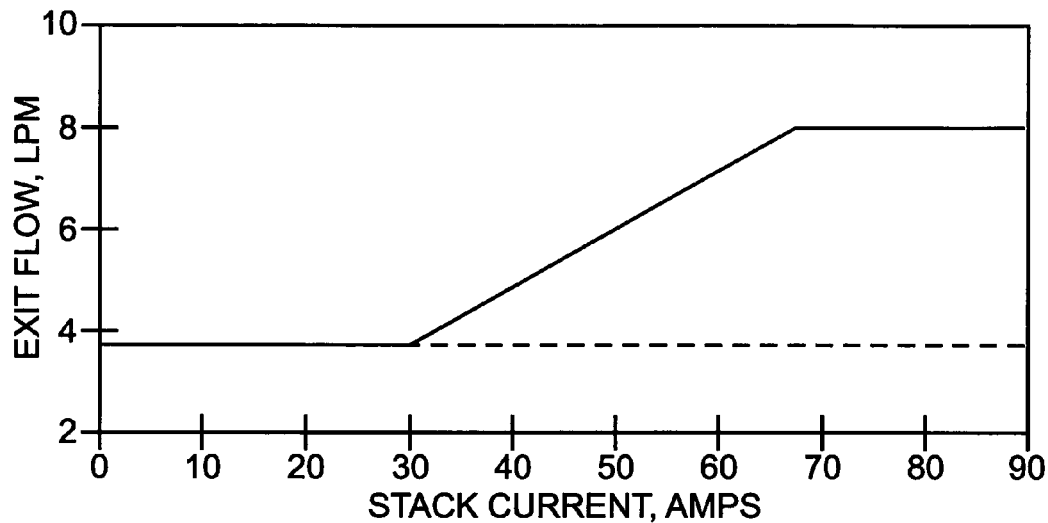
FIG. 6 is a graph of unused fuel exit flow as a function of stack current when the supply pressure is maintained at the target pressures depicted in FIG. 5.

FIG. 6 is a graph of selected set values of exit flow as a function of stack current for the operating conditions corresponding to FIG. 5. It is seen in this example that the exit flow increases linearly with stack current through the normal operating range of approximately 30 and 68 amps. The set values of exit flow of unused fuel are constrained between the limits of about 3.6 lpm (liters per minute) and 8.0 lpm, corresponding to a minimum exit pressure of 2 kPa and a maximum exit pressure of 10 kPa.

Figure 7:
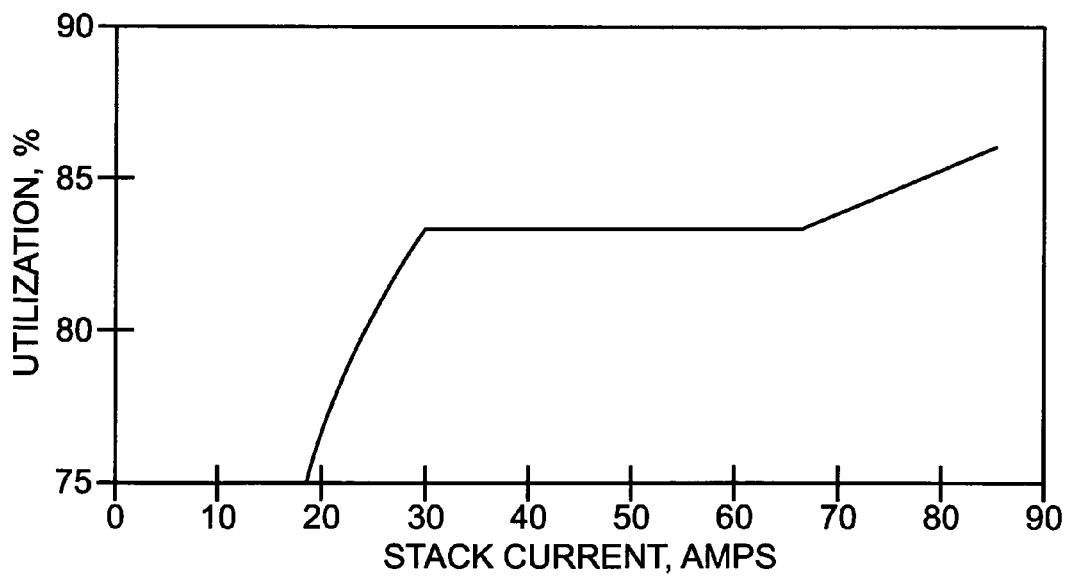
FIG. 7 is a graph of the utilization of fuel in the fuel cell stack as a function of stack current when the supply pressure is maintained at the target pressures depicted in FIG. 5.

FIG. 7 is a graph of hydrogen utilization as a function of stack current for the same illustrative operating conditions. The utilization is maintained at 83% over the normal operating range of the fuel cell stack. In this example, the utilization drops off for a stack current of less than approximately 30 amps, and rises relatively linearly above approximately 68 amps.

These illustrative figures demonstrate that the exit flow F2 is proportional to the stack current for a constant utilization of 83%. By adjusting stack current (consumption) to hold exit flow F2 on the Exit Flow F2 curve of FIG. 6, stack hydrogen utilization is maintained at 83% over a large portion of the stack operating range. At the stack current of 78 amps, utilization is just hitting 85%.

Control of fuel cell stack 24 and/or fuel source 46 by control system 80 may be accomplished, at least in part, using these various values and relationships. The exit pressure identified in the graph of FIG. 5 may be used as a target pressure for the supply of fuel to the fuel cell stack. This pressure may also be referred to as a target exit pressure. The relationship illustrated incorporates fuel flow consumed in the fuel cell stack as well as unused fuel that is discharged. These relationships are derived from the outlet or exit pressure and the stack current. Other parameter relationships may also be derived.

As has been discussed, the various control parameters may be used in different ways to control various components of fuel cell system 22. For example, the exit fuel flow, and correspondingly, the exit pressure, provide an indication of the amount of fuel provided by fuel source 46. Operation of the fuel source, and in particular the stoichiometry of the fuel processor, may be based on this information. Further, the air supply and fuel cell may be controlled to provide a supply pressure that will result in a desired utilization of the fuel. Production of supply fuel and fuel cell exit pressure may be adjusted to provide a desired supply pressure. Also, the exit orifice may be adjusted to vary the exit flow and/or exit pressure. Accordingly, by maintaining a target pressure for the supply fuel for a given stack current, the fuel utilization may be maintained at a desired level.

Illustrative, non-exclusive or required, descriptions of aspects of the fuel cell system presented herein are presented below. For example, control system 80 may be adapted to detect the exit pressure of unused fuel from an exit orifice, and/or to detect the electrical current produced by the fuel cell stack. The flow of unused fuel may be based on the detected exit pressure. The consumption of fuel by the fuel cell stack, in turn, may be determined based on the determined flow of unused fuel and/or the electrical current produced by the fuel cell stack. Accordingly, the control system may be adapted to determine the flow of supply fuel based on the electrical current produced by the fuel cell stack and the exit pressure. Further, the control of operation of at least one of the fuel source 46 and the fuel cell stack 24 may be based on the flow of unused fuel and/or based on the determined consumption of fuel by the fuel cell stack 24.

As an additional example, control system 80 may be described as being adapted to detect the level of electrical power produced, to determine a target supply pressure at which the fuel cell stack consumes a given proportion of the supply fuel for a given level of electrical power produced by the fuel cell stack, and to control operation of the fuel cell stack based on the target supply pressure. For example, the fuel source and/or the fuel cell stack may be controlled to maintain the fuel supply or exit pressure at about the target pressure. Further, the control system may be further adapted to control operation of the fuel source in a manner tending to change the supply or exit pressure to the target pressure. A change in the electrical power produced by the fuel cell stack may be detected, and the target supply pressure may then be changed based on the detected change in the electrical power. In examples where the fuel source is adapted to produce the supply fuel from one or more feedstocks, the control system may be adapted to control use of the feedstocks by the fuel source based on the determined target pressure and/or based on a determined flow of supply fuel. In examples where the fuel source includes a fuel processor that produces the supply fuel, the control system may be adapted to determine the stoichiometry of the chemical process based on the determined flow of supply fuel, and control production of the supply fuel based on the determined stoichiometry.

The above operating states and subroutines have been presented to provide examples of how the control system may automate the operation of fuel cell system 22 and/or energy producing and consuming assembly 56. The examples provided above should not be construed in a limiting sense, as many variations of the operating characteristics, parameter values, and fuel cell system design and configuration are possible without departing from the scope of the present disclosure.

INDUSTRIAL APPLICABILITY

Fuel cell systems and control systems described herein are applicable in any situation where power is to be produced by a fuel cell stack. It is particularly applicable when the fuel cell stack forms part of a fuel cell system that includes a fuel processing assembly that provides a feed for the fuel cell stack.

The automation of fuel cell system 22 enables it to be used in households, vehicles and other commercial applications where the system is used by individuals that are not trained in the operation of fuel cell systems. It also enables use in environments where technicians, or even other individuals, are not normally present, such as in microwave relay stations, unmanned transmitters or monitoring equipment, etc. Control system 80 also enables the fuel cell system to be implemented in commercial devices where it is impracticable for an individual to be constantly monitoring the operation of the system. For example, implementation of fuel cell systems in vehicles and boats requires that the user does not have to continuously monitor and be ready to adjust the operation of the fuel cell system. Instead, the user is able to rely upon the control system to regulate the operation of the fuel cell system, with the user only requiring notification if the system encounters operating parameters and/or conditions outside of the control system's range of automated responses.

The above examples illustrate possible applications of such an automated fuel cell system, without precluding other applications or requiring that a fuel cell system necessarily be adapted to be used in any particular application. Furthermore, in the preceding paragraphs, control system 80 has been described controlling various portions of the fuel cell system. The system may be implemented without including every aspect of the control system described above. Similarly, system 22 may be adapted to monitor and control operating parameters not discussed herein and may send command signals other than those provided in the preceding examples.

It is believed that the disclosure set forth above encompasses multiple distinct methods and/or apparatus with independent utility. While each of these methods and apparatus has been disclosed in its preferred form, the specific examples thereof as disclosed and illustrated herein are not to be considered in a limiting sense as numerous variations are possible. The subject matter of the disclosures includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that correspond to disclosed examples and are novel and non-obvious. Other combinations and subcombinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

I claim:

1. A method of operating a fuel cell system, comprising:
   producing a supply fuel at a supply pressure;
   applying oxidant and the supply fuel to a fuel cell stack, which includes at least one fuel cell, and which is adapted to produce electrical current therefrom;
   discharging fuel unused by the fuel cell stack through an exit orifice at an exit pressure;
   detecting the exit pressure;
   determining the flow of unused fuel based on the exit pressure; and
   controlling production of the supply fuel based on the determined flow of unused fuel.

2. The method of claim 1, in which determining the flow of unused fuel includes solving the equation $F=K\sqrt{P}$, where F is the flow of unused fuel, K is a constant, and P is the exit pressure.

3. The method of claim 1, further comprising detecting the electrical current produced by the fuel cell stack, and controlling production includes controlling production of the supply fuel at a pressure based on the electrical current produced by the fuel cell stack.

4. The method of claim 1, further comprising determining the flow of supply fuel, and controlling production of the supply fuel based on the determined flow of supply fuel.

5. The method of claim 4, in which producing a supply fuel includes determining the efficiency of the production of the supply fuel based on the determined flow of supply fuel, and controlling production of the supply fuel includes controlling the production of the supply fuel in a manner improving the efficiency of the production of the supply fuel.

6. The method of claim 4, in which producing a supply fuel includes producing the supply fuel using a chemical process, and controlling production of the supply fuel includes determining the stoichiometry of the chemical process based on the determined flow of supply fuel, and controlling production of the supply fuel based on the determined stoichiometry.

7. The method of claim 4, in which determining the flow of supply fuel includes detecting the electrical current produced by the fuel cell stack, and determining the flow of supply fuel based on the electrical current produced by the fuel cell stack and the exit pressure.

8. The method of claim 4, in which supplying a supply fuel includes producing the supply fuel from one or more feedstocks based on the determined flow of supply fuel.

9. The method of claim 1, wherein the exit orifice, has a fixed size.

* * * * *